United States Patent [19]

Hamai et al.

[11] 4,395,983
[45] Aug. 2, 1983

[54] SWIRL-CHAMBER DIESEL ENGINE WITH SWIRL CHAMBER HAVING DEPRESSION FOR COLLECTING FUEL DROPLETS

[75] Inventors: Kyugo Hamai, Yokosuka; Masayuki Tamura, Yokohama, both of Japan

[73] Assignee: Nissan Motor Company, Ltd., Yokohama, Japan

[21] Appl. No.: 257,553

[22] Filed: Apr. 27, 1981

Related U.S. Application Data

[63] Continuation of Ser. No. 940,127, Sep. 6, 1978, abandoned.

[30] Foreign Application Priority Data

Dec. 20, 1977 [JP] Japan .......................... 52-172592[U]

[51] Int. Cl.³ .............................. F02B 3/00; F02B 3/02
[52] U.S. Cl. .................................... 123/263; 123/261; 123/262
[58] Field of Search ............... 123/263, 260, 261, 262, 123/275

[56] References Cited

U.S. PATENT DOCUMENTS 4,124,000 11/1978 Genslak ................................. 123/263
4,186,692 2/1980 Kawamura et al. ................. 123/263

FOREIGN PATENT DOCUMENTS 2537041 8/1975 Fed. Rep. of Germany ...... 123/262
2537847 3/1977 Fed. Rep. of Germany ...... 123/275

*Primary Examiner*—Raymond A. Nelli
*Attorney, Agent, or Firm*—Schwartz, Jeffery, Schwaab, Mack, Blumenthal & Koch

[57] ABSTRACT

The invention relates to a swirl-chamber Diesel engine. A swirl-chamber Diesel engine is disclosed which has a main combustion chamber, a swirl chamber, and a communicating passage for connecting them. The problem encountered is that, when the engine runs at low speeds, fuel droplets within the swirl chamber will gather and flow along the communicating passage into the main combustion chamber. To prevent this unfavorable fuel flow, a depression is formed within the swirl chamber to collect the fuel droplets. The depression is disposed adjacent to and communicating with the communicating passage via a rounded lip to provide an arrangement which will make it easy for the combustion gases flow to draw the collected fuel from the depression. Since the fuel is drawn from the depression by the combustion gases flow, carbonization of fuel on the depression wall will not take place.

9 Claims, 5 Drawing Figures

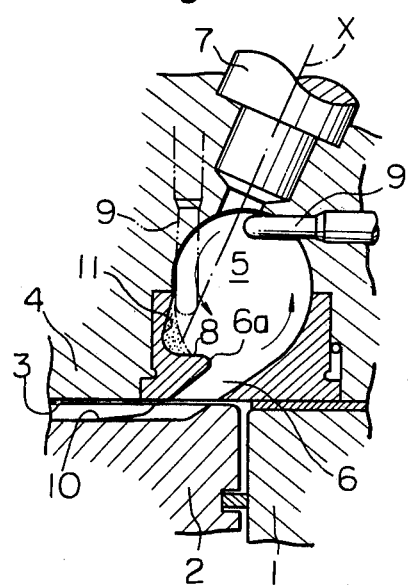
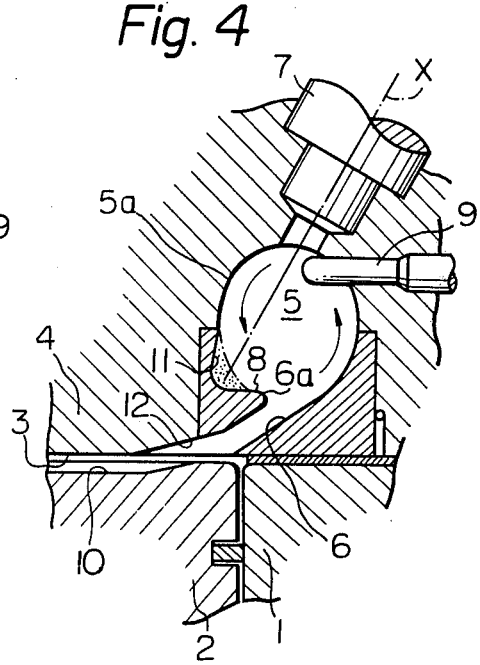
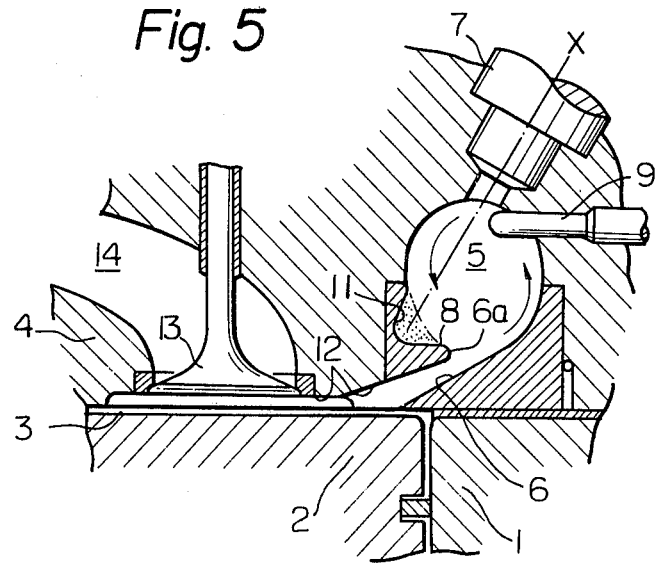

SWIRL-CHAMBER DIESEL ENGINE WITH SWIRL CHAMBER HAVING DEPRESSION FOR COLLECTING FUEL DROPLETS

This is a continuation of application Ser. No. 940,127, filed Sept. 6, 1978, now abandoned.

BACKGROUND OF THE INVENTION

The present invention relates to swirl-chamber Diesel engines.

Swirl-chamber Diesel engines comprise a cylinder block, a piston reciprocally disposed in a cylinder of the cylinder block, a cylinder head secured to the cylinder block and closing the cylinder, a main combustion chamber formed in the cylinder between the piston and the cylinder head, a generally spherical swirl chamber formed in the cylinder head and a communication passage formed in the cylinder head to establish communication between the main and auxiliary combustion chambers. The communicating passage connects tangentially into the swirl chamber so that during the compression stroke of the piston part of air charge in the main combustion chamber flows into the swirl chamber along a line tangent to the wall thereof to generate swirl therein. A fuel injection nozzle is mounted to the cylinder head and opens into the swirl chamber. Within the swirl chamber a shoulder is formed around the port of the passage at which the passage opens into the swirl chamber and located on the opposite side to the side along which air flows into the swirl chamber from the communicating passage during the compression stroke of the piston. The injection nozzle points toward the shoulder so as to direct jet of fuel toward and along the swirl of air in the swirl chamber such that the jet of fuel will not enter directly into the main chamber through the communicating passage. A heater plug or glow plug extends into the swirl chamber to produce heat close to the jet of fuel to give a starting aid. The piston is formed at its crown with a depression of a spherical design. This depression, when the piston is on its top dead center, forms part of the complete combustion chamber. It consists of cup-shaped cavities communicating at their junctions with the swirl chamber. By dividing the subsequent combustion gases flow from the passage into two streams flowing around the cup-shaped cavities some degree of air swirl during combustion is generated outside the swirl chamber; this encourages the feeding of fresh air to the emerging fuel.

In regard to operation of the Diesel engine constructed as above, during the compression stroke of the piston, the air charge in the main combustion chamber is compressed so that part thereof flows into the swirl chamber through the communicating passage thereby to generate swirl therein so as to be compressed to produce a heat zone at the center of the swirl. The jet of fuel from the fuel injector or injection nozzle is directed into the swirl to be ignited by the heat generated by the swirl. The subsequent combustion gases flow into the main combustion chamber from the communicating passage to effect diffusion burning.

In operation, when the engine, as constructed above, runs at low engine speed, such as, when the engine is idling, the swirl of air within the swirl chamber is weak and not strong enough so that the fuel injected from the nozzle will not mix well with the air. The fuel droplets, therefore, tend to adhere to the swirl chamber wall, flowing along the wall of the passage into the main combustion chamber, thus likely to result in ignition within the main combustion chamber and in knockings.

SUMMARY OF THE INVENTION

It is therefore an object of the present invention to improve a swirl-chamber Diesel engine by preventing unfavorable flow of fuel, in liquid form, toward a main combustion chamber from a communicating passage.

According to the present invention, a swirl chamber has formed therein a depression which will collect fuel droplets within the swirl chamber to prevent them from entering into a communicating passage. The depression is disposed adjacent to and communicates with a communicating passage via a rounded lip. This arrangement will make it easy for combustion gases flow to draw the fuel from the depression thereinto.

BRIEF DESCRIPTION OF THE DRAWINGS

In the accompanying drawings

FIG. 3 is a partial sectional view similar to FIG. 1 showing a first preferred embodiment of a Diesl engine according to the present invention;

FIG. 4 is a similar view to FIG. 3 showing a second preferred embodiment according to the present invention; and FIG. 5 is a similar view to FIG. 3 showing a third preferred embodiment according to the present invention.

DESCRIPTION OF THE PREFERRED EMBODIMENTS

Figure 1:
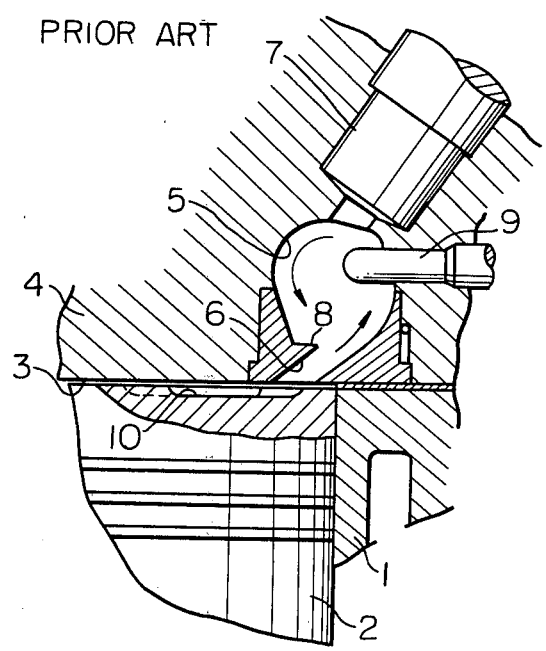
FIG. 1 is a partial sectional view of a conventional swirl-chamber Diesel engine.

Before entering into the description of the preferred embodiments of the present invention, the conventional swirl-chamber Diesel engine will be explained in connection with FIGS. 1 and 2 so as to make clear the feature of the invention over the prior art.

A swirl chamber Diesel engine shown in these Figures comprises a cylinder block 1, a piston 2 reciprocally movable in a cylinder formed in the cylinder block 1 and a cylinder head 4 secured to the cylinder block 1 to close the cylinder so that a main combustion chamber 3 is formed in the cylinder between the crown of the piston 2 and the cylinder head 4. The cylinder head has formed therein a swirl chamber 5 communicating with the main combustion chamber 3 through a communicating passage 6 also formed through the cylinder head 4. The passage 6 is so shaped and inclined as to permit, during the compression stroke of the piston 2, part of air charge within the main combustion chamber 3 to enter into the swirl chamber 5 along a line tangent to the swirl chamber wall thereby to generate swirl in the swirl chamber 5. A fuel injector or injection nozzle 7 is mounted to the cylinder head 4 with its spout communicating with the swirl chamber 5. The fuel injection nozzle 7 points to the swirl chamber 5 wall disposed adjacent a shoulder 8 and is inclined such that jet of fuel injected from the fuel injection nozzle 7 may be directed along the swirl of air within the swirl chamber 5 and may not enter directly into the main combustion chamber 3. A heater plug or glow plug 9 extends into the swirl chamber 5 to produce heat close to the fuel to give starting aid. The piston 2 is formed at its crown with a depression 10 of a spherical design. This depression 10, when the piston 2 is on its top dead center, forms part of the complete combustion chamber. It consists of two cup-shaped cavities communicating at their junctions with the swirl chamber 5. By dividing the subsequent combustion gases flow from the communicating passage 6 into two streams flowing around the cup-shaped cavities, some degree of air swirl during combustion is generated outside of the swirl chamber 5; this encourages the feeding of fresh air to the emerging fuel.

In regard to operation of the conventional Diesel engine, during the compression stroke of the piston 2, the air charge within the main combustion chamber 3 is compressed so that part thereof flows into the swirl chamber 5 through the communicating passage 6 thereby to generate swirl therein so as to be compressed to produce a heat zone at the center of the swirl. The jet of fuel injected from the fuel nozzle 7 is directed into the swirl to be ignited by the heat generated by the swirl. The subsequent combustion gases flow into the main combustion chamber 3 from the communicating passage 6 into the main combustion chamber 3 to effect diffusion burning. The problem to be solved is that, when the engine runs at low speeds, such as at a idling, the swirl of air charge within the swirl chamber 5 is weak so that the fuel droplets having failed to be carried by the swirling air are likely to adhere to the wall adjacent the shoulder 8, flowing along, in liquid form, along the wall of the passage 6 toward the main combustion chamber 3, resulting in ignition within the main combustion chamber 3 and in knockings.

Figure 2:
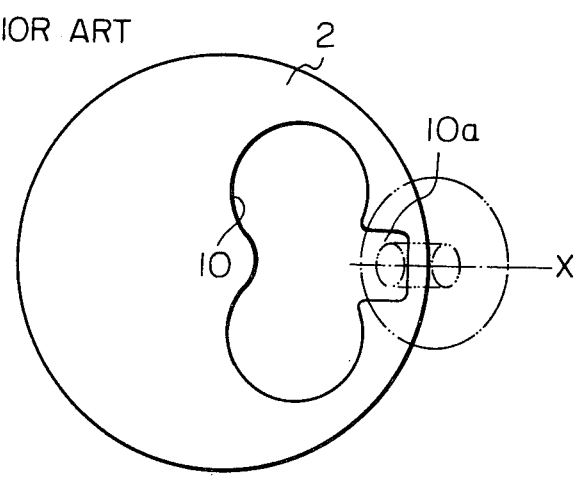
FIG. 2 is a cross sectional view of the engine of FIG. 1 showing the shape of the combustion chamber cavity.

The preferred embodiments according to the present invention will be described hereinafter in connection with FIGS. 3 through 5 in which the same reference numeral as used in FIGS. 1 and 2 are used to designate similar parts to those shown in FIGS. 1 and 2.

As shown in FIG. 3, a depression 11 is formed at that area around adjacent port of a communicating passage 6 and adjacent a shoulder 8 on which the fuel droplets which failed to be carried by the swirling air will impinge when the engine runs at low engine speeds, such as, when the engine is idling. In this embodiment, the depression 11 is located on a straight line (X) extending from a fuel injection nozzle 7. It consists of a cavity plunging or depressed into the body of the cylinder head from the wall which curves generally along the paths along which the air within the swirl chamber will move.

At that part of the port of the passage 6 which is disposed adjacent to and connects into the depression 11, the port of the passage 6 is rounded as at 6a to provide a rounded lip. The purpose of the provision of the rounded lip 6a is to make easy the drawn-out of the collected fuel droplets into the stream of burning combustion gases as the combustion gases flow into the main combustion chamber 3 from the swirl chamber 5.

The location of a glow plug 9 in this embodiment is different from the glow plug location of the conventional engine as shown in FIGS. 1 and 2. As shown in FIG. 3, the electrode of the glow plug 9 is located adjacent the upper wall portion of the swirl chamber 5 so as not to decrease the swirl rate of air within the swirl chamber 5. Preferably, the electrode of the glow plug may be located adjacent that side wall of the swirl chamber on which the depression 11 is located with its tip approaching the depression 11. With this glow plug arrangement the collected fuel droplets in the depression 11 may be ignited by the heat of the glow plug 9 upon starting the engine and the ignition delay may be thus shortened as compared to the case in which the fuel droplets entrained by the swirling air is ignited. The results in a reduction in combustion noise.

When the engine runs at low engine speeds, such as, when the engine is idling, the fuel droplets that have failed to mix with the swirling air in the swirl chamber 5 may be collected in the depression 11 because the swirling air motion under this engine operating condition is not so strong enough to carry all fuel droplets. Since the upstanding depression wall section, which connects smoothly into the swirl chamber wall, is depressed away from the paths along which swirling air will flow the collected fuel droplets will not be drawn out of the depression by the swirling stream of air. Thus, under engine operation at low engine speeds, such as, at idling, fuel droplets are prevented from dropping along the passage wall into the main combustion chamber 3 and knocking at idling, which often encountered in the conventional engine shown in FIGS. 1 and 2, is prevented in the engine embodying the present invention.

After the subsequent ignition of the fuel droplets entrained by the swirling air within the swirl chamber 5, the combustion gases flow through the communicating passage 6 into the main combustion chamber 3 drawing the collected fuel droplets out of the depression 11. Since the collected fuel droplets are drawn out each time after ignition takes place and contribute to diffusion burning in the main combustion chamber 11, carbonization of the fuel droplets collected in the depression 3 will not take place, which would cause smoke emission. Thus, with the depression 11 and the rounded lip 6a, carbonization of fuel droplets in the swirl chamber 5 which would cause smoke formation is prevented because all of the fuel droplets failing to be entrained in the swirling air are collected in the depression 11 and such collected fuel droplets are completely drawn out of the depression into the main combustion together each time when the combustion gases flow into the main combustion chamber 3 through the passage 6.

As described above, the engine performance at low engine speeds has been improved according to the invention. Under engine operation at high speeds, strong swirl is formed which is enough to carry all of the fuel injected from the fuel nozzle. Thus under this condition, fuel droplets will not drop into the main combustion chamber 3 flowing along the passage wall.

When the engine runs at high engine speeds, the depression 11 will not receive the fuel droplets because the swirling air motion under this engine operating condition is strong enough to carry substantially all fuel droplets.

Referring to FIG. 4, the embodiment illustrated herein differs from the FIG. 3 embodiment in that a cylinder head 4 is formed at the inner wall thereof a depression 12 communicating with a passage 6. The depression 12 consists of such a cavity as to help subsequent combustion gases from the passage 6 in diffusing in the main combustion chamber 3. Thus, sufficient diffusion burning is possible and formation of unburnt products can be reduced considerably. In addition to this, since the combustion continues within the depression 12 disposed below a depression or trough 11 to increase the temperature of the trough walls, the evaporation of the collected fuel droplets within the trough 11 may be prompted by this heat so that engine performance at idling operation can be improved.

Preferably as shown in FIG. 5, an exhaust port 14 cooperable by an exhaust valve 13 is located with the area within the interior wall of the cylinder head 4 where a depression 12 is formed so as to facilitate the scavening of the exhaust gases from the main combustion chamber 3 through the exhaust port passage 14. This is advantageous in improving fuel economy.

What is claimed is:

1. A swirl-chamber Diesel engine comprising:
a cylinder block having a cylinder therein;
a piston reciprocally movable in said cylinder;
a cylinder head secured to said cylinder block to close said cylinder to form within said cylinder a main combustion chamber between said piston and said cylinder head;
said cylinder head having a swirl chamber therein and a communicating passage interconnecting said swirl chamber and said main combustion chamber;
a glow plug having an electrode projecting into said swirl chamber;
said swirl chamber having therein a depression;
a fuel injector arranged such that when said engine operates at relatively low engine speeds, the entire fuel charge is directed concurrent with air moving in said swirl chamber and toward said depression and at least a portion of said fuel charge not entrained in air moving in said swirl chamber collects therein; and
means defining a rounded lip between said depression and said passage extending into said swirl chamber; and
means for sucking said at least a portion of said fuel charge out of said depression during passage of flame from said swirl chamber through said communicating passage to said main combustion chamber, said sucking means comprising said lip means, said depression and said passage.

2. A swirl-chamber Diesel engine as claimed in claim 1, in which said electrode of said glow plug is disposed adjacent wall means defining said swirl chamber.

3. A swirl-chamber Diesel engine as claimed in claim 2, in which said electrode has a leading end portion thereof disposed adjacent said depression for evaporation of the fuel therein.

4. A swirl-chamber Diesel engine as claimed in claim 1, wherein said cylinder head is formed, at a surface forming part of said main combustion chamber, with a second depression which communicates with a third depression formed at a crown of said piston when said piston is at its top dead center; and in which said second depression disposed below said depression within said swirl chamber.

5. A swirl-chamber Diesel engine as claimed in claim 1, including an exhaust arrangement including an exhaust port located within the area where said second depression is formed.

6. In a Diesel engine:
means defining a cylinder;
a piston reciprocally disposed in said cylinder to define a variable volume main combustion chamber;
means defining a fixed volume swirl chamber and a passage from said swirl chamber to said main combustion chamber;
a fuel injector disposed so as to project into said swirl chamber for injecting fuel thereinto;
a glow plug disposed in close proximity of said injector and arranged to project into the injection path of said injector;
means for defining a depression in said swirl chamber opposite said injector and adjacent said passage, for collecting any fuel not entrained in the air which swirls in said swirl chamber when said engine operates at relatively low engine speeds;
means for defining a rounded lip between said depression and said passage, said lip extending into said swirl chamber, for retaining any fuel collected therein and preventing same from draining into said main combustion chamber; and
means for sucking said collected fuel out of said depression when a flame passes through said passage, said sucking means comprising said lip defining means, said depression and said passage.

7. A method of operating a Diesel engine at relatively low engine speeds, comprising the steps of:
swirling air in a swirl chamber;
injecting fuel into said swirling air via a fuel injector;
collecting any fuel not entrained in said swirling air in a depression disposed in said swirl chamber opposite said injector and adjacent a passage leading from said swirl chamber to a main variable volume combustion chamber;
retaining the fuel collected in said depression by providing a rounded lip between said depression and said passage extending into said swirl chamber;
heating and igniting the fuel entrained in said swirling air via a glow plug disposed adjacent to said injector which projects into the injection path of said injector;
passing a flame past said lip and through said passage to said main combustion chamber; and
sucking any fuel collected in said depression out of said depression using said flame.

8. In a Diesel engine:
means defining a cylinder;
a piston reciprocatively disposed in said cylinder to define a variable volume main combustion chamber;
means defining a fixed volume swirl chamber and a passage leading from said swirl chamber to said main combustion chamber;
a fuel injector disposed in said swirl chamber for injecting fuel into said swirl chamber in a direction substantially concurrent with the air which swirls therein;
means defining a depression in said swirl chamber substantially opposite said fuel injector in the form of a depressed wall section, said wall section connects smoothly into the wall defining said swirl chamber, said wall section is depressed away from the path along which the air which swirls in said swirl chamber flows so that any fuel droplets which are not entrained in the air which swirls in said swirl chamber collect in said depression and are not drawn thereoutof by said swirling air;
means defining a smooth rounded lip between said depression and said passage, said lip extending into said swirl chamber which prevents any fuel collected in said depression from draining into said passage; and
means for drawing any fuel collected in said depression thereoutof when the combustion gases generated in said swirl chamber flow therefrom through said passage into said main combustion chamber, said drawing means comprising said lip defining means and said passage.

9. A Diesel engine as claimed in claim 8, wherein said passage tapers as it leads from said main combustion chamber to said swirl chamber.

* * * * *